United States Patent
Yoshie

(10) Patent No.: US 8,326,016 B2
(45) Date of Patent: Dec. 4, 2012

(54) CHECK INFORMATION TAMPERING DETECTION METHOD

(75) Inventor: Shinichi Yoshie, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1296 days.

(21) Appl. No.: 12/050,551

(22) Filed: Mar. 18, 2008

(65) Prior Publication Data
US 2008/0310699 A1    Dec. 18, 2008

(30) Foreign Application Priority Data
Mar. 29, 2007   (JP) .................... 2007-086798

(51) Int. Cl.
*G06K 9/00* (2006.01)
(52) U.S. Cl. .................................... 382/139
(58) Field of Classification Search .......... 382/135–140; 705/45; 235/379–384; 902/7–10; 356/71–73
See application file for complete search history.

(56) References Cited

U.S. PATENT DOCUMENTS
| 6,572,025 | B1 | 6/2003 | Nishikado et al. |
| 2003/0056104 | A1* | 3/2003 | Carr et al. ................ 713/176 |
| 2003/0075596 | A1* | 4/2003 | Koakutsu ................ 235/379 |
| 2005/0071283 | A1* | 3/2005 | Randle et al. ............ 705/75 |
| 2007/0165261 | A1 | 7/2007 | Someya |

FOREIGN PATENT DOCUMENTS
| JP | 2000-083154 A | 3/2000 |
| JP | 2001-078013 | 3/2001 |
| JP | 2001-203872 | 7/2001 |
| JP | 2001-203885 | 7/2001 |
| JP | 2002-063142 | 2/2002 |
| JP | 2004-206362 | 7/2004 |
| JP | 2004-343523 A | 12/2004 |
| JP | 2005-269055 | 9/2005 |
| JP | 2005-269057 A | 9/2005 |

* cited by examiner

Primary Examiner — Atiba O Fitzpatrick

(57) ABSTRACT

A check processing system enables determining if tampering has occurred while sending check image information captured by a check processing device to a server. The digitally watermarked image information and the magnetic ink character data are then sent through a host computer to the server. If the image information is tampered with on the host computer, the server cannot extract the magnetic ink character data from the received image information, and even if the magnetic ink character data can be extracted, the extracted magnetic ink character data will be different from the magnetic ink character data received by the server.

3 Claims, 4 Drawing Sheets

CHECK INFORMATION TAMPERING DETECTION METHOD

CROSS-REFERENCE TO RELATED APPLICATIONS

Japanese Patent application No. 2007-086798 is hereby incorporated by reference in its entirety.

BACKGROUND

1. Field of Invention

The present invention relates to a check processing system for sending and managing image information and magnetic ink character information that is captured from a check by a check processing terminal and sent to a host device to which the check processing terminal is connected. The invention relates more particularly to a check information tampering detection method that can determine if the image information or magnetic ink character information read from a check has been tampered with on the host device.

2. Description of Related Art

Checks that are used by customers at the point of sale to pay for a purchase are processed by a check processing terminal that reads the magnetic ink character information that is printed using magnetic ink on the front of the check and captures an image of the check front. An electronic funds transfer is then effected based on the account number and other bank information that is captured from the read magnetic ink character information. Once the electronic funds transfer is completed, delivering the physical check to the bank or other financial institution is not necessary, and the check is returned to the customer after the necessary information has been written on the check front and the check has been endorsed. Because the store will have no proof of the check payment once the check is returned to the customer, the scanned check image is stored as proof of payment.

The check processing terminal is usually located at the checkout counter and connected to the host computer (host device) by a cable. The host computer is typically connected to a server (host) over a communication line, the magnetic ink character information and image information captured by the check processing terminal is sent through the host computer to the server, and the server centrally manages check information from the check processing terminals. Japanese Unexamined Patent Appl. Pub. JP-A-2004-206362 teaches a check processing terminal that can be used in this type of check processing system.

When a fraudulent transaction occurs at a store, one possibility is that the image information or magnetic ink character information acquired by the check processing terminal has been tampered with before the information is sent to the server in order to change the face amount, for example. One possible solution to this problem is to embed information for detecting tampering with the transmitted image information as a digital watermark when the image information is sent from the host computer to the server, and have the server that receives the image information determine if the image information has been tampered with. Japanese Unexamined Patent Appl. Pub. JP-A-2001-78013 teaches a method that uses a digital watermark to determine if there has been any tampering with the image information.

However, software for tampering with the image information before the digital watermark is embedded could be installed to the host computer. In this case the server cannot detect tampering based on the received image information having the embedded digital watermark, and therefore cannot detect fraudulent transactions that occurred at the store.

SUMMARY OF INVENTION

A check information tampering detection method according to the present invention can detect tampering that occurs while the image information and magnetic ink character information that is read by a check processing terminal is sent through a host computer to a server. A check processing system according to another aspect of the invention uses this check information tampering detection method to determine if check information has been tampered with.

A first aspect of the invention is a method of detecting tampering with check image information, having steps of: reading the front of a check by a check processing device to get check image information; reading magnetic ink character data from magnetic ink characters on the check by the check processing device; embedding the magnetic ink character data in the image information as a digital watermark by the check processing device; sending the digitally watermarked image information and the magnetic ink character data to a host device; extracting the magnetic ink character data from the digitally watermarked image information received by the host device; and determining that the digitally watermarked image information and the magnetic ink character data have not been tampered with if the extracted magnetic ink character data and the received magnetic ink character data match.

This aspect of the invention embeds the magnetic ink character data that is read from the check as a digital watermark in the check image that is captured by the check processing device. Because the magnetic ink character data is embedded by the check processing device in the image information, the magnetic ink character data cannot be extracted from the image information received by the server if the image information is tampered with on the host computer located on the image information transmission path between the check processing device and the server. In addition, even if the magnetic ink character data can be extracted, the extracted magnetic ink character data will be different from the magnetic ink character data that is received by the server. It can therefore be determined that the image information and magnetic ink character data sent from the check processing device through the host computer to the server have not been tampered with if the extracted magnetic ink character data and the received magnetic ink character data match. It is also not necessary to separately provide information for detecting tampering because the magnetic ink character data that is required for electronic check processing is used as the information for detecting tampering.

A method of detecting tampering with check image information according to another aspect of the invention has steps of adjusting the time of a real-time clock circuit on the check processing device based on time synchronization information received from the host device (server); reading the front surface of the check by the check processing device to get check image information; reading magnetic ink character data from magnetic ink characters on the check by the check processing device; embedding the magnetic ink character data and the time output by the real-time clock circuit in the image information as a digital watermark by the check processing device; sending the digitally watermarked image information and the magnetic ink character data to the host device; storing the reception time at which the host device received the digitally watermarked image information; extracting the magnetic ink character data and the time from the digitally watermarked image information; and determining that the digitally watermarked image information and the magnetic ink character data have not been tampered with if the extracted magnetic ink character data and the received magnetic ink character data match and the time difference between the extracted time and the reception time is within a prescribed time.

This aspect of the invention synchronizes the time on the check processing device and the time on the server, and embeds the time at which the check processing device captured the check image as a digital watermark in the check image information. The magnetic ink character data that is read from the check is also embedded as a digital watermark. Because the check processing device embeds both the time the check was imaged and the magnetic ink character data, the time and the magnetic ink character data cannot be extracted from the image information received by the server if the image information is tampered with on the host computer located on the image data communication path between the check processing device and the server. In addition, even if the time and the magnetic ink character data can be extracted, the time required for tampering will appear as a time difference between the extracted time and the reception time. The extracted magnetic ink character data will also be different from the magnetic ink character data that is received by the server. It can therefore be determined that the image information and magnetic ink character data sent from the check processing device through the host computer to the server have not been tampered with if the extracted magnetic ink character data and the received magnetic ink character data match and the time difference between the extracted time and the reception time is within a prescribed time.

In order to stop electronic processing of checks when normal communication with the host device is not possible, the check processing device preferably does not read the front of the check if the time of the real-time clock circuit of the check processing device cannot be adjusted based on the time synchronization information from the host device.

A check processing device according to the invention embeds tampering detection information in the check image information as a digital watermark, and then sends the image information to the host device. By then extracting the tampering detection information from the image information, tampering after the image information has been sent to the host device can be detected.

In order to use the magnetic ink character data read from the magnetic ink characters as the tampering detection information, the check processing device preferably has a magnetic ink character reader that reads magnetic ink characters printed on the check and outputs magnetic ink character data, the information embedder embeds the magnetic ink character data as the tampering detection information in the image information, and the transmitter transmits the magnetic ink character data with the digitally watermarked image information.

In order to use the time at which the check was imaged as the tampering detection information, the check processing device preferably has a real-time clock circuit that adjusts the time based on time synchronization information from the connected host device; and the information embedder embeds the time output from the real-time clock circuit when the image reader imaged the check as the tampering detection information in the image information.

The invention causes the check processing device to embed tampering detection information in the captured check image before sending the image information through the host computer to the server. Because tampering detection information is embedded in the image information by the check processing device, the server cannot extract the tampering detection information from the received image information if the image information has been tampered with on the host computer located in the path of image information transmission, and even if the tampering detection information can be extracted, the extracted information will be different from the desired information. Determining if the image information has been tampered with on the data communication path from the check processing device to the server is therefore possible. Transactions can therefore be processed safely when processing electronic fund transfers using checks.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a check processing system according to the present invention is described below with reference to the accompanying figures.

Arrangement of the Check Processing System

Figure 1:
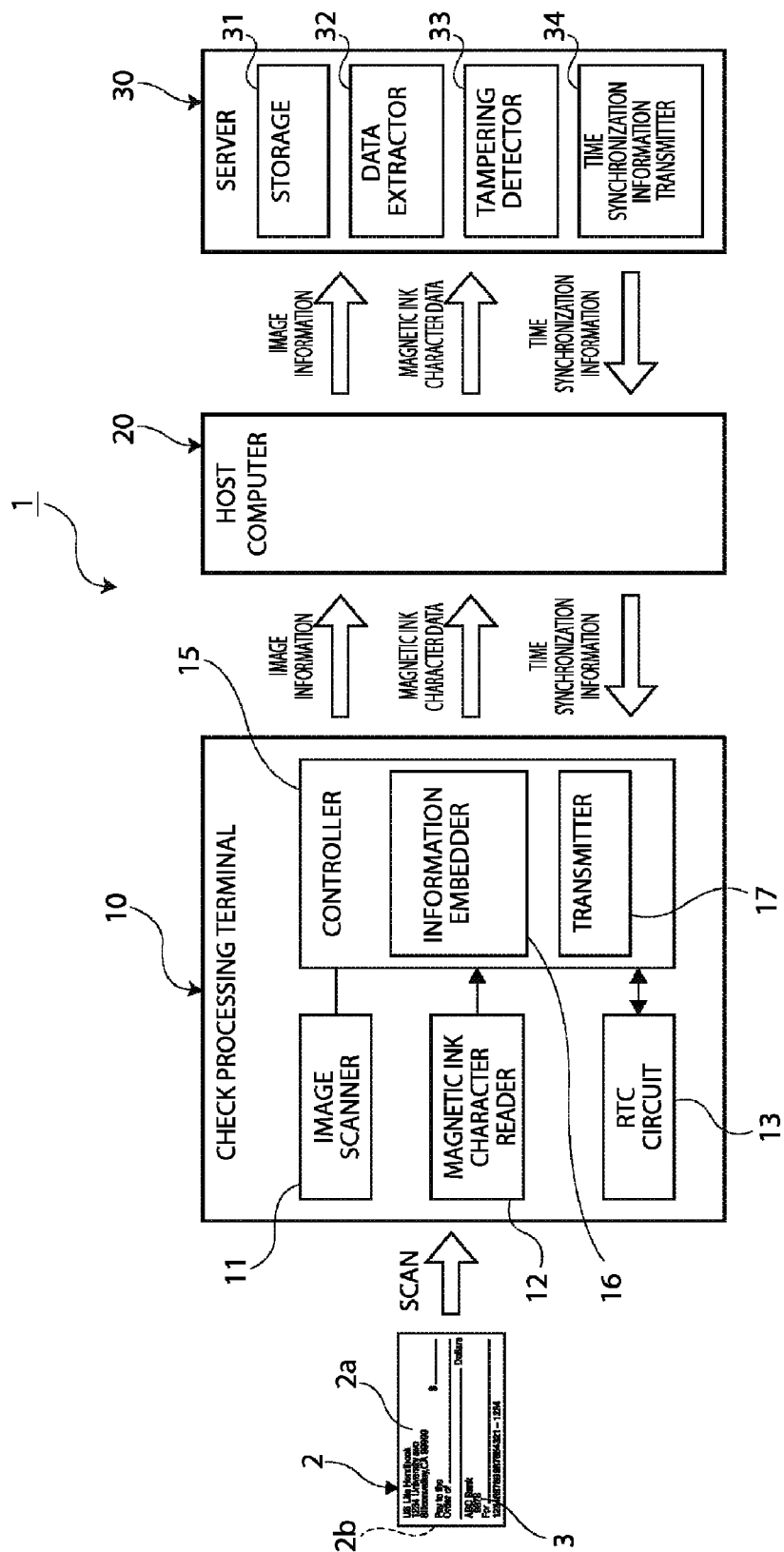
FIG. 1 is a block diagram of a check processing system according to the present invention.

FIG. 1 is a block diagram of a check processing system according to a preferred embodiment of the invention. As shown in FIG. 1, the check processing system 1 includes a check processing terminal 10, a host computer 20, and a server 30. The check processing terminal 10 images the front 2a of the check 2 and reads the magnetic ink character information, including bank account information, that is printed in magnetic ink characters 3. The host computer 20 is connected to the check processing terminal 10 by a cable. The server 30 is connected to the host computer 20 by a communication line. The check processing terminal 10 and host computer 20 are typically installed at the checkout counter in a store, and the server 30 is located in the store headquarters. The magnetic ink character information read from the check 2 by the check processing terminal 10 is used for an electronic funds transfer transaction between the store and the financial institution (typically a bank) or between the store headquarters and the bank. The magnetic ink character information and image information captured from the check 2 by the check processing terminal 10 is sent through the host computer 20 to the server 30, and is centrally managed by the server 30.

The check processing terminal 10 includes an image reader 11, a magnetic ink character reader 12, a real-time clock (RTC) circuit 13, and a controller 15.

The image reader 11 has an image scanner that scans the front 2a of a check 2 conveyed through a transportation path formed in the check processing terminal 10, and outputs the captured image information.

The magnetic ink character reader 12 recognizes the magnetic ink characters 3 printed on the front 2a of the check 2 conveyed through the transportation path and outputs the result as the magnetic ink character information, and includes an MICR (magnetic ink character recognition) head for reaching the magnetic ink characters 3, and a character recognitter that recognizes the magnetic ink characters 3 based on the signal output from the MICR head.

The RTC circuit 13 outputs the time, and corrects the internal time based on a time synchronization signal sent from the server 30 in order to synchronize with the server.

The controller 15 includes an information embedder 16 and a transmitter 17. The information embedder 16 embeds the magnetic ink character information output from the magnetic ink character reader 12 and/or the time output from the RTC circuit 13 as a digital watermark in the image information output from the image scanner 11. The transmitter 17 sends the resulting digitally watermarked image information to the host computer 20. The transmitter 17 also sends the magnetic ink character data to the host computer 20.

The host computer 20 is an electronic cash register or personal computer. The host computer 20 sends the digitally watermarked image information and magnetic ink character information received from the check processing terminal 10 to the server 30. The host computer 20 also sends the time synchronization information sent from the server 30 to the check processing terminal 10.

The server 30 has a storage 31, a data extractor 32, a tampering detector 33, and a time synchronization information transmitter 34. The storage 31 stores the reception time at which the digitally watermarked image information is received. The data extractor 32 extracts the information that is embedded as the digital watermark from the received image information. The tampering detector 33 determines if the image information has been tampered with based on the extracted information. The time synchronization information transmitter 34 sends the time synchronization information to the host computer 20.

The tampering detector 33 determines that the image information received by the server 30 has not been tampered with if the magnetic ink character information extracted by the data extractor 32 and the received magnetic ink character information match. The tampering detector 33 also determines that the image information received by the server 30 has not been tampered with if the difference between the time extracted by the data extractor 32 and the reception time stored by the storage 31 is within a prescribed time. This prescribed time is set based on the time required to tamper with the image on the host computer 20.

The magnetic ink characters 3 are printed in a line along the bottom of the front 2a of the check 2. The magnetic ink characters 3 identify the bank and the account number. The check amount, payer, check number, payer signature, and other information are printed or written on the front 2a against a background pattern. An endorsement line is also provided on the back 2b of the check.

Detecting Tampering Using the Magnetic Ink Character Information

Figure 2:
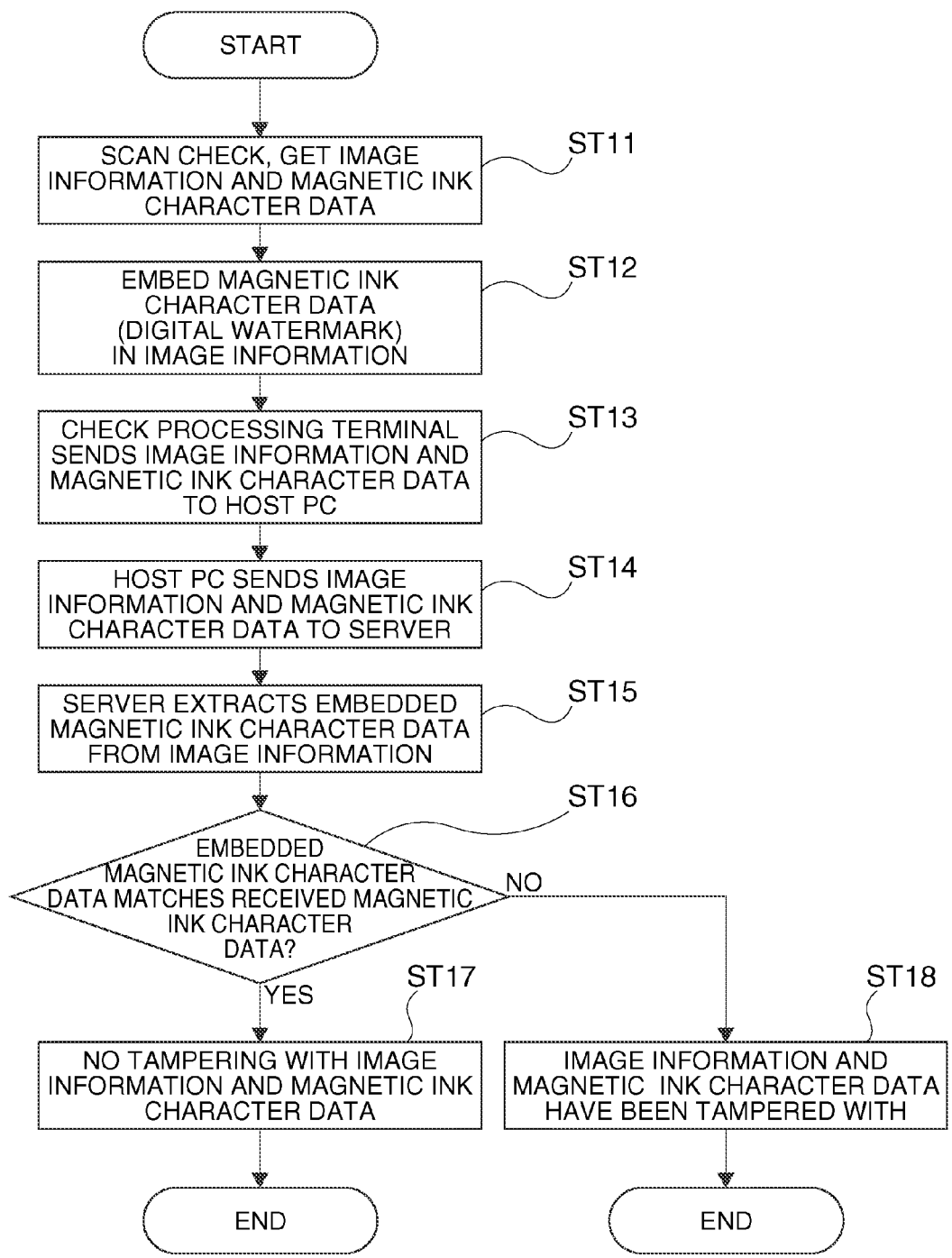
FIG. 2 is a flow chart describing an operation for detecting tampering based on the magnetic ink character information.

FIG. 2 is a flow chart of the operation whereby the magnetic ink character information is embedded as a digital watermark in the image information, and tampering with the image information is detected based on the magnetic ink character data.

When a check 2 issued by a customer is processed by the check processing terminal 10, the check processing terminal 10 scans the front 2a of the check 2 to capture a check image. The check processing terminal 10 also reads the magnetic ink character information from the printed magnetic ink characters 3 (step ST11).

The controller 15 embeds the magnetic ink character information as a digital watermark in the image information (step ST12), and sends the digitally watermarked image information and magnetic ink character information to the host computer 20 (step ST13). When the magnetic ink character information is embedded as a digital watermark in the image information, the information is embedded so that the magnetic ink character information that was embedded as the digital watermark cannot be extracted or if it is extracted the value changes if the image information is tampered with.

The host computer 20 then sends the received digitally watermarked image information and magnetic ink character information to the server 30 (step ST14). On the server 30 side, the data extractor 32 then extracts the magnetic ink character data from the received digitally watermarked image information (step ST15). The tampering detector 33 then compares the extracted magnetic ink character data with the received magnetic ink character data (step ST16).

If the information matches, the tampering detector 33 determines that the image information has not been tampered with (step ST17). If the information does not match, or if the magnetic ink character data cannot be extracted, the tampering detector 33 determines that the image information has been tampered with (step ST18).

After embedding the magnetic ink character data read from the check 2 as a digital watermark in the check 2 image captured by the check processing terminal 10, this aspect of the invention sends both the resulting digitally watermarked image information and the magnetic ink character data through the host computer 20 to the server 30. Because the check processing terminal 10 embeds the magnetic ink character data in the image information, the server 30 will not be able to extract the magnetic ink character data from the received image information if the scanned image is tampered with on the host computer 20. In addition, even if the magnetic ink character data can be extracted, the extracted magnetic ink character data will be different from the magnetic ink character information that is separately received by the server 30. As a result, tampering with image information that is sent from the check processing terminal 10 through the host computer 20 to the server 30 can be detected based on the magnetic ink character data that is embedded as a digital watermark. It is also possible to determine if the magnetic ink character data has been tampered with.

It is also not necessary to prepare additional information for detecting tampering because the magnetic ink character data that is required to electronically process the check 2 is used as the information that is embedded as the digital watermark for detecting tampering.

The magnetic ink character data that is transmitted with the digitally watermarked image information is preferably encrypted for transmission. This aspect of the invention also does not require providing the check processing terminal 10 with a RTC circuit 13.

Detecting Tampering Using the Time When the Image Information Is Captured

Figure 3A:
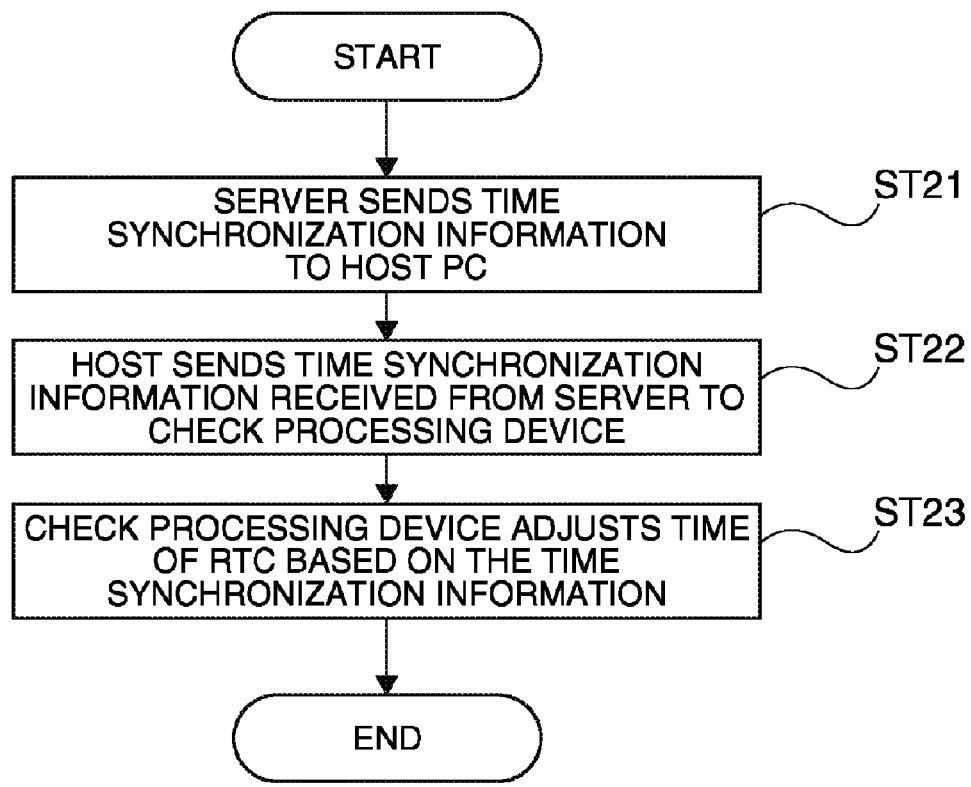
FIGS. 3A and 3B are flow charts describing an operation for detecting tampering based on the check scanning time.
Figure 3B:
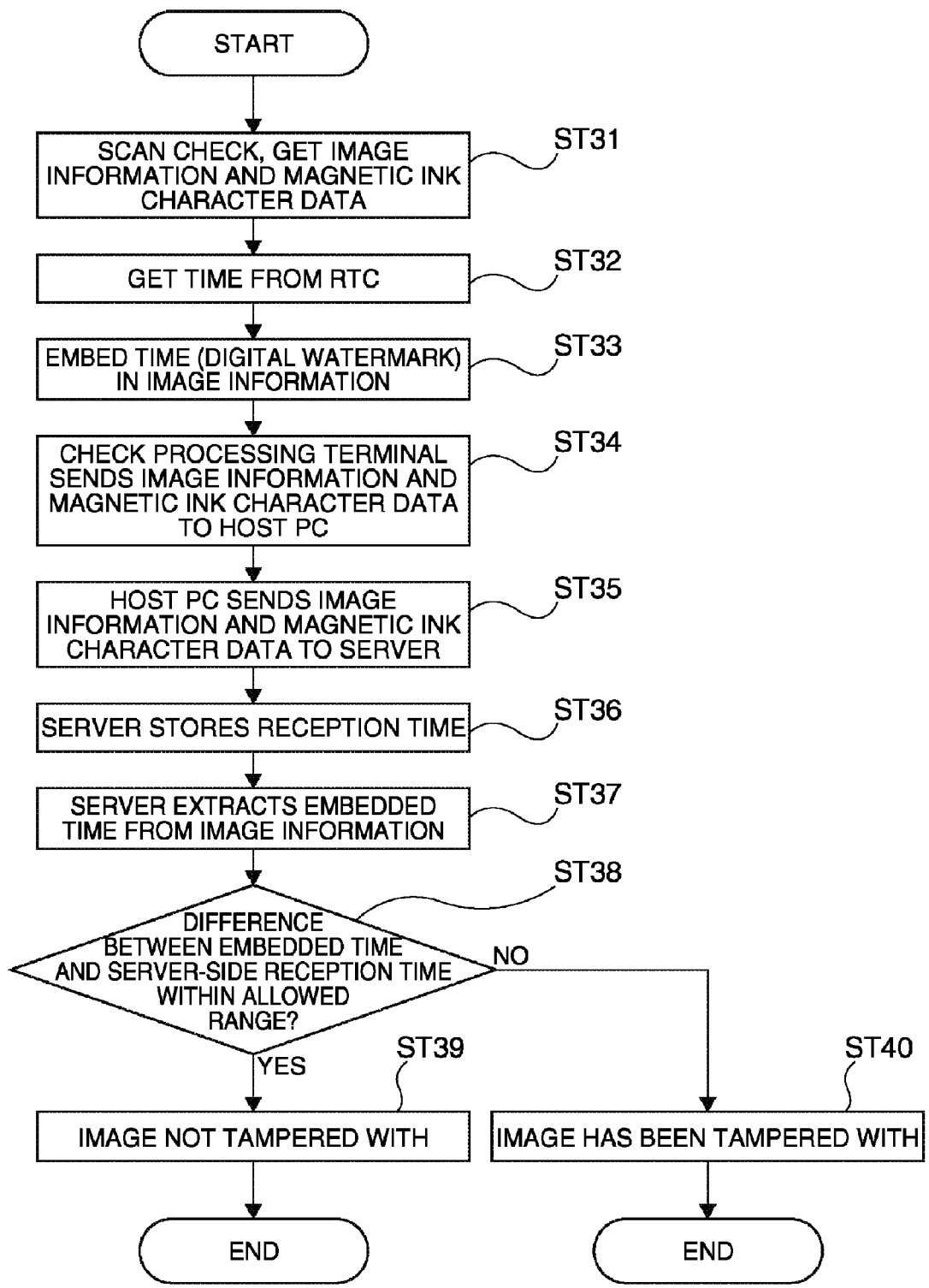

FIG. 3 is a flow chart describing detecting tampering using the time at which the check processing terminal scans the front of the check. FIG. 3A shows the operation of the check processing system 1 immediately before the check processing terminal reads the check, and FIG. 3B describes the operation for embedding the time as the digital watermark in the image information, and then determining if the image information has been tampered with based on the embedded time.

As shown in FIG. 3A, the check processing terminal 10 corrects the time of the RTC circuit 13 before reading the check 2. The server 30 sends the time synchronization information to the host computer 20 (step ST21), and the host computer 20 forwards the received time synchronization information to the check processing terminal 10 (step ST22). When a check 2 issued by a customer is then inserted to the check processing terminal 10, the check processing terminal 10 corrects the internal time kept by the RTC circuit 13 based on the received time synchronization information, and synchronizes with the time kept by the server 30 (step ST23).

Then, as shown in FIG. 3B, the check processing terminal 10 scans the front 2a of the check 2 and captures the image information (step ST31). The controller 15 also gets the time output by the RTC circuit 13 (step ST32), and embeds the time in the image information as the digital watermark (step ST33). The digitally watermarked image information is then sent to the host computer 20 (step ST34).

The host computer 20 then sends the received digitally watermarked image information to the server 30 (step ST35). The storage 31 of the server 30 then stores the reception time at which the digitally watermarked image information was received (step ST36). The data extractor 32 then extracts the time from the received digitally watermarked image information (step ST37).

The tampering detector 33 compares the extracted time with the reception time (step ST38), and determines that the image information has not been tampered with if the difference between the two times is within a prescribed time (step ST39). If the difference between the two times exceeds this prescribed time, the tampering detector 33 determines that the image information has been tampered with (step ST40).

If the time synchronization information sent from the server 30 through the host computer 20 cannot be received by the check processing terminal 10, data communication within the check processing system 1 is not normal. The check 2 reading operation of the check processing terminal 10 therefore stops and electronic check processing is interrupted.

Because the check processing terminal 10 embeds the time at which the check was scanned in the image information, the time cannot be extracted from the image information if the image information has been tampered with on the host computer 20. In addition, even if the time is extracted, the time required for tampering will appear in the time difference between the extracted time and the reception time if the image information has been tampered with on the host computer 20. As a result, tampering with image information that is sent from the check processing terminal 10 through the host computer 20 to the server 30 can be detected based on the time that is embedded as a digital watermark.

Variations of the Invention

The process of detecting tampering using the magnetic ink character data read from the check 2, and the process of detecting tampering using the time when the image information was captured, are executed separately in the embodiments described above. Tampering can also be detected using both the magnetic ink character data and the image information scanning time, however. In this case, the time kept by the check processing terminal 10 and the time kept by the server 30 are synchronized, and the time at which the check 2 was scanned is embedded as a digital watermark in the check 2 image captured by the check processing terminal 10. After embedding the magnetic ink character data read from the check 2 as a digital watermark, the digitally watermarked image information and the magnetic ink character data are sent through the host computer 20 to the server 30. The tampering detector 33 of the server 30 then determines that the image information has not been tampered with if it determines that there was no tampering based on both the time and the magnetic ink character data extracted from the digitally watermarked image information.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A method of detecting tampering with check image information, comprising steps of:
adjusting the time of a real-time clock circuit on a check processing device based on time synchronization information received from a host device;
reading the front surface of the check by the check processing device to get check image information;
reading magnetic ink character data from magnetic ink characters on the check by the check processing device;
embedding the magnetic ink character data and the time output by the real-time clock circuit in the image information as a digital watermark by the check processing device;
sending the digitally watermarked image information and the magnetic ink character data to the host device;
storing the reception time at which the host device received the digitally watermarked image information;
extracting the magnetic ink character data and the time from the digitally watermarked image information; and
determining that the digitally watermarked image information and the magnetic ink character data have not been tampered with, if the extracted magnetic ink character data and the received magnetic ink character data match and the time difference between the extracted time and the reception time is within a prescribed time.

2. The method of detecting tampering with check image information described in claim 1, wherein:
the front surface of the check is not read if the time of the real-time clock circuit of the check processing device cannot be adjusted based on the time synchronization information from the host device.

3. A check processing device comprising:
an image reader that images the front surface of a check and outputs image information;
an information embedder that embeds prescribed tampering detection information as a digital watermark in the image information;
a transmitter that sends the digitally watermarked image information to a connected host device;
a magnetic ink character reader that reads magnetic ink characters printed on the check and outputs magnetic ink character data; and
a real-time clock circuit that adjusts the time based on time synchronization information from the connected host device;
wherein the information embedder embeds the magnetic ink character data and the time output from the real-time clock circuit when the image reader imaged the check as the tampering detection information in the image information; and
the transmitter transmits the magnetic ink character data with the digitally watermarked image information.

* * * * *